Feb. 18, 1958  H. M. HOYT  2,823,971
TACKLE BOX
Filed April 6, 1955  2 Sheets-Sheet 1

INVENTOR.
Helen May Hoyt
BY
ATTORNEY

Feb. 18, 1958. H. M. HOYT 2,823,971
TACKLE BOX
Filed April 6, 1955 2 Sheets-Sheet 2

INVENTOR.
Helen May Hoyt
BY
ATTORNEY

United States Patent Office 2,823,971
Patented Feb. 18, 1958

2,823,971

TACKLE BOX

Helen May Hoyt, Denver, Colo.

Application April 6, 1955, Serial No. 499,593

3 Claims. (Cl. 312—290)

This invention relates to carriers and more particularly to equipment carriers for sportsmen and the like, which carriers are adapted as storage containers.

In general, the carrier of the invention comprises a multiple compartment container which has a harness for carrying the container on the person of the user out of the way of normal movement. The carrier, as adapted for fishermen, has equipment holders easily accessible for the user even in the awkward positions fishermen frequently find themselves. The container has a compartment or equipment securing means for all the common pieces of equipment used by fishermen or sportsmen.

While traversing field and stream in search of the wily trout, an angler may travel substantial distances from his base of operations. As is usual, most fishermen desire to carry more equipment than can be conveniently carried by known means, and this situation results in a either backward traverse by the fisherman to his base of operations or going without equipment deemed essential for complete sport by the individual angler. If, on the other hand, the angler carries all desired equipment using presently known means, he is overburdened with awkward and unwieldy pieces of equipment secured to various parts of his person, generally hindering normal movement, and making fishing all but impossible. With the carrier of the present invention, however, the angler is able to carry large amounts or varieties of equipment without having the equipment interfere with normal fishing activities and without unduly burdening and hampering the normal movements. The fisherman may be wading streams, crashing through dense underbrush, crawling through fences, and even creeping on likely looking fishing holes, all while engaged in the ancient sport of fishing. Such vigorous activity requires that the sportsmen be relatively unencumbered by equipment which so hampers the movements that it either ruins the sport or makes it so disagreeable as to be no sport at all.

The present invention provides means for carrying substantially all normal equipment required for "the complete angler" and further, the invention provides means for storing the equipment in the carrying means during periods of inactivity, or during out-of-season storage requirements. The device combines accessibility with large capacity and portability, yet retaining lightness, compactness, and unencumbering storage and carrying capacity.

The feature of accessibility of equipment without hampering normal movement is important. In many instances, the need for a particular piece of equipment presents itself in most unusual and inconvenient positions. While standing hip-deep in a stream, a fisherman may need a new leader, a hook, a net or the like, and unless the equipment is readily obtainable, the angler must leave his position and retreat to the comparative firmness of the bank for rehabilitating the equipment for further pursuance of the sport. The carrier of the present invention provides means for quick and easy accessibility even though the user is not in the most favorable position for adjusting his gear or re-rigging the equpment for further indulgence of the art.

The carrier of the present invention provides internal compartments in a container, for small pieces of equipment and the container provides means for securing large bulky pieces of equipment to the exterior of the container. The interior compartments of the container are accessible without removal of the equipment secured to the outside. This important feature permits removal of either the large equipment or the small equipment without substantially hampering the other. The small equipment, for instance, may be moved from the interior of the container without removing the larger equipment attached to the outside. A fisherman, for example, may have an extra pole secured to the container and yet have the interior compartments always accessible without removal of the pole. On storage for off season periods, the external equipment may be retained in position and as new equipment is purchased throughout the periods of inactivity, it may be added to the interior or secured to the outside depending on the bulk of the equipment. The carrier contains sized compartments, providing means for carrying various objects. For example, small compartments are provided for hooks, leaders, weights, and the like, and a larger compartment is provided for bulky objects such as reels, spools of line, etc. or even food or liquid refreshments. Another compartment is provided for means for carrying game, fish, etc. during the pursuance of the sport.

It is an object, therefore, of the invention to provide a light compact equipment carrier.

Another object of the invention is to provide an equipment carrier which has accessibility of the carried equipment.

A still further object of the invention is to provide an equipment carrier which does not hamper normal movements of the sportsman in pursuance of his endeavor.

A further object of the invention is to provide an equipment carrier which is adapted as a storage container for the equipment when not in active use.

These and other objects and advantages would be readily understood by referring to the following description and appended drawings, in which.

Figure 1:
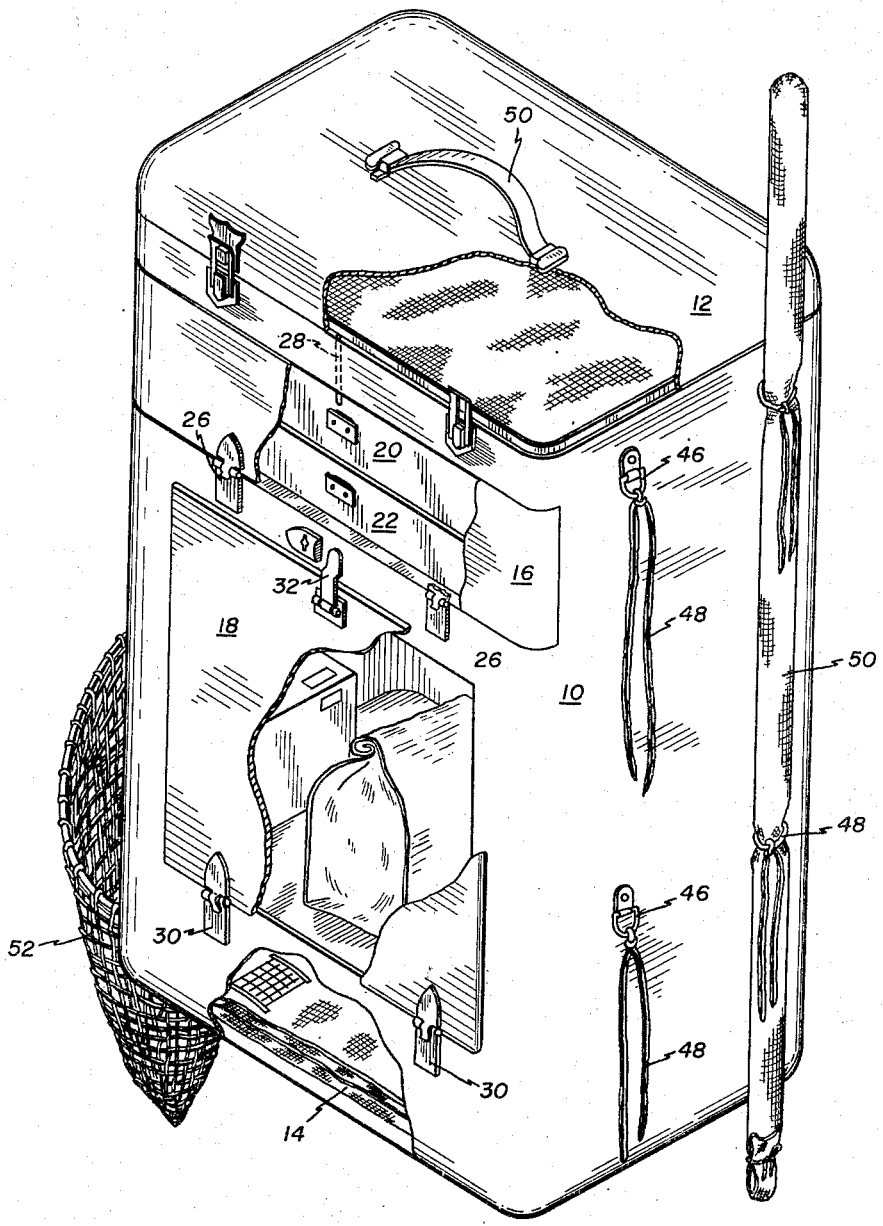
Fig. 1 is a perspective view of a device according to the invention in partial section.
Figure 2:
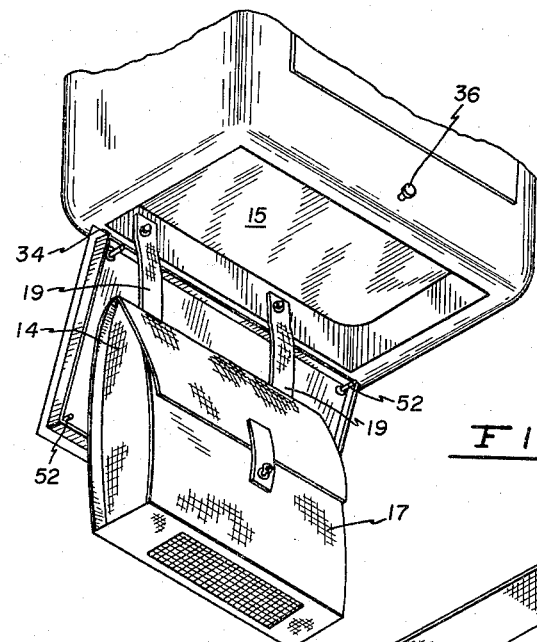
Fig. 2 is a perspective view of the lower container of the equipment carrier.
Figure 3:
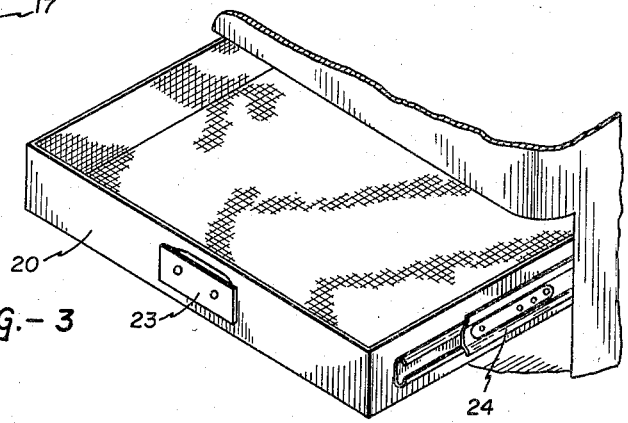
Fig. 3 is a perspective view of a drawer of the container according to the present invention.
Figure 4:
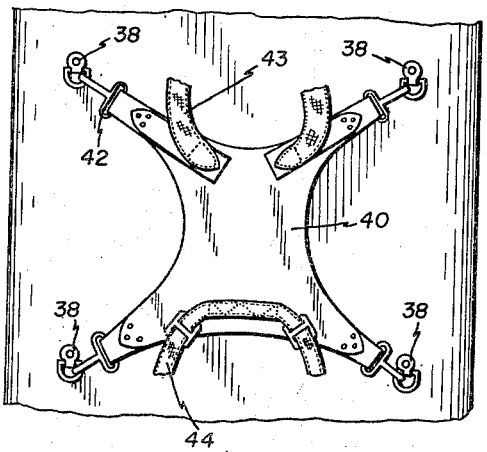
Fig. 4 is a plan view of the carrying strap connection with the carrier.

In the device illustrated, the carrier comprises a body 10 which is a hollow container having multiple closures thereon. The container has a hinged top 12 and a hinged bottom 14. The hinged top 12 substantially covers the entire top and in closed position forms a small curved extension of the container wall to the top of the container. The lower door 14 comprises a flush-type door in the bottom of the container, which door covers only part of the complete bottom of the container. A small hinged door 16, near the top of the container, opens downwardly away from the top of the container. A larger door 18 in the middle part of the container directly below the small door 16 also opens downwardly from the top. The four doors are so arranged that they all open substantially on one side of the container, or at least open from a point beyond one side of the container. The top door 12 covers a shallow recess in the top of the container which extends substantially to all the sides of the container, and is adapted to store small items of equipment, such as fish hooks, leaders, flies, etc. The small upper door 16 encloses a pair of retractable drawers 20 and 22. The drawers, as shown in Fig. 3, retract on extendable arms 24, so that the entire drawer may be pulled beyond the wall profile exposing the entire contents of the drawers. The door 16 opens on hinges 26, and is locked by means of a pin 28 which extends through the wall between the door 18 and the door 16. The pin 28 operates with the opening and closing of the door 12 so that the door 16 may be opened only when the door 12 is open. In closed position, the door 12 holds the pin into the door 16. When the door 12 is opened, the pin is pushed upwardly under spring tension, releasing the door 16 and exposing the two retractable drawers. The door 18 is hinged about the bottom edge thereof by means of hinges 30 and is locked shut by means of a snap lock 32. The snap lock 32 has a locking means to prevent unauthorized entrance into the large compartment enclosed by the door 18. The bottom door 14 is hinged along the back side by means of piano hinges and the like, and has a snap lock 36 for holding the door in closed position. The snap lock permits ready opening of the bottom by merely pushing the button, gravity continuing the opening process.

The side of the container opposite the doors 16 and 18 carries the strap mechanisms for securing the carrier on the body of the person of the user. The carrying strap arrangement comprises hooks 38 secured to the container and a cross secured thereto by means of four snap hooks attached to the points of the cross. A shoulder harness 43 is secured to the upper end thereof, and a belt harness 44 is secured to the lower end thereof. The shoulder harness and the belt harness may be standard equipment such as used for military packs and the like, and is not, therefore, an inventive part of the present invention, so that the carrying harness will not further be described.

On the two lateral sides of the container 10, plural rings 46 are secured, and tying thongs 48 are secured to the rings 46. Large equipment may be secured to the outside of the container without interfering with the operation of any of the doors of the container. For instance, a rod 50 may be secured to a pair of the tying thongs, or a net 52 may be, likewise, secured to the thongs, etc., out of the way of the normal operation of the doors.

The bottom door 14 encloses a small chamber 15, into which a game carrying bag 17 may be secured. The game bag 17 should be foldable or collapsible so as to fit within the small space 15 when the door 14 is closed. The game bag 17 may be secured by straps 19 so as to extend beyond the door when it is open. This permits easy access into the game bag. In closed position, the bag 17 folds neatly into the space 15, and the door 14 holds the bag inside. On releasing the catch 36, the door 14 opens and the game bag falls out into position for use.

A handle 50 secured to the top door 12, permits easy handling of the device when not carried on the person of the user by means of the carrying straps. So long as the top door is closed and locked, the handle 50 may be used to carry the container. Rubber bumpers 52 secured through the door 14 provide a small stand for the container when sitting on a surface. The bumpers may be sufficiently long to keep the bottom portion of the container well out of contact with the surface on which it is sitting. This provides aeration underneath the container and permits year around storage of the equipment carried in the carrier.

Normally, the container will be carried on the back of the person of the user, similar to a military pack, and the like, however, the carrier may be carried on the chest. In either case, however, the carrier is accessible to the user for removing or replacing equipment therein. When secured on the back of the user, all equipment is out of the way of the normal movement of the user. This is true when the user is engaged in the sport of fishing, and movements of casting, trolling, etc. are not hampered by the use of the carrier. When tramping around the countryside, the user is relatively unencumbered by equipment, and the like, even if the user is a hunter. The carrier does not hamper the normal use of firearms, walking sticks, and the like. When not carried by the person of the user, the containers provides an excellent storage container for equipment. For example, the fishing poles may be secured to the outside, and the compartments of the container may still be accessible even when the container is sitting on a shelf, etc. The equipment carried on the outside will not interfere with the opening and closing of the drawers enclosing the storage spaces within the container, so that equipment acquired during storage periods is easily deposited within the confines of the container.

Normally, the container is made of light weight material, such as, aluminum, laminated plastics, plastics and the like, to keep the weight down to a minimum. Likewise, the container may be sized according to usage, i. e., for short jaunts a larger container may be used, for long trips a smaller container may be required to keep within a weight limit.

In accordance with law the invention has been illustrated by specific example, but there is no intent to limit the invention to the precise details so disclosed except insofar as defined by the appended claims.

I claim:

1. In a fisherman's tackle box having means for attachment to the body of a user, the combination of a box-like container, a top for said container hinged for opening and arranged to expose the full-cross-sectional area of the container, a hinged door in a wall of said container adjacent to and opening in a direction away from said top, a lock pin for securing said hinged door in closed position and operable by said top whereby said hinged door may be locked when said top is closed and unlocked when said top is open, a plurality of drawers slidably mounted in said container in position to be enclosed by said hinged door when closed, a bottom closure for said container hinged for opening and arranged to open downwardly in the general direction of the opening of said top, said bottom closure closing a space in the lowermost section of said container, and a game bag mounted in said space and arranged to extend downwardly in suspended position below said container when said bottom is open and arranged to be moved up into said space when the bottom closure is moved into closed position.

2. In a fisherman's tackle box having means for attachmentaion to the body of a user, the combintaion of a box-like container, a top for said container hinged to a first upright wall thereof and arranged to expose the full cross-sectional area of the container when open, a hinged door in the wall of said container opposite said first wall of said container, a lock pin for securing said hinged door in closed position and operable by said hinged top whereby said hinged door may be locked when said top is closed and unlocked when said top is open, a plurality of drawers slidably mounted in said container in position to be enclosed by said hinged door when closed, a bottom closure for said container hinged for opening and arranged to open downwardly in the general direction of the opening of said top, said bottom closure closing a space in the lowermost section of said container which is sealed from the remainder of the container, and a game bag mounted in said space and arranged to extend downwardly in suspended position below said container when said bottom is open and arranged to be moved up into said space when the bottom closure is moved into closed position.

3. In a fisherman's tackle box having means for attachment to the body of a user, the combination of a box-like container, a top for said container hinged to a first upright wall thereof and arranged to expose the full cross-sectional area of the container, a first hinged door in the wall of said container opposite said first upright wall, a lock pin for securing said first hinged door in closed position and operable by said hinged top whereby said first hinged door may be locked when said top is closed and unlocked when said top is open, a plurality of lure-holding drawers slidably mounted in said container in position to be enclosed by said first hinged door when closed, an intermediate compartment spaced from said drawers, a hinged door for said compartment in the wall opposite said first upright wall, a bottom closure for said container arranged to open downwardly in the same direction as said top, said bottom closure closing a space in the lowermost section of said container which is sealed from the remainder of the container, and a game bag mounted in said space and arranged to extend downwardly in suspended position below said container when said bottom is open and arranged to be moved up into said space when the bottom closure is moved into closed position.

References Cited in the file of this patent

UNITED STATES PATENTS

| | | |
|---|---|---|
| 1,031,821 | Schwarzenback | July 9, 1912 |
| 1,407,290 | McNary | Feb. 21, 1922 |
| 2,098,636 | Smith et al. | Nov. 9, 1937 |
| 2,264,744 | Dunnam | Dec. 2, 1941 |
| 2,555,073 | Zdankoski | May 29, 1951 |